(12) United States Patent
Yeom et al.

(10) Patent No.: US 12,466,446 B2
(45) Date of Patent: Nov. 11, 2025

(54) METHOD OF CONTROLLING SWITCHING TO MANUAL DRIVING MODE OF AUTONOMOUS VEHICLE

(71) Applicants: HYUNDAI MOTOR COMPANY, Seoul (KR); KIA CORPORATION, Seoul (KR)

(72) Inventors: Myung Ki Yeom, Incheon (KR); In Su Kim, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 18/097,843

(22) Filed: Jan. 17, 2023

(65) Prior Publication Data

US 2024/0101159 A1 Mar. 28, 2024

(30) Foreign Application Priority Data

Sep. 28, 2022 (KR) .......................... 10-2022-0122935

(51) Int. Cl.
*B60W 60/00* (2020.01)
*B60W 50/14* (2020.01)

(52) U.S. Cl.
CPC ........ *B60W 60/0053* (2020.02); *B60W 50/14* (2013.01); *B60W 2050/146* (2013.01); *B60W 2540/215* (2020.02); *B60W 2552/10* (2020.02)

(58) Field of Classification Search
CPC ............. B60W 60/0053; B60W 50/14; B60W 2050/146; B60W 2540/215; B60W 2552/10; B60W 60/0059; B60W 2556/45; B60W 50/082; B60W 60/0015
See application file for complete search history.

(56) References Cited

U.S. PATENT DOCUMENTS

| 10,053,074 B2 | 8/2018 | Kindberg |
| 10,093,292 B2 | 10/2018 | Moore et al. |
| 10,747,220 B2 * | 8/2020 | Uchida ............. B60W 60/0061 |

FOREIGN PATENT DOCUMENTS

| CN | 113518956 B | * 10/2019 | ............... G05D 1/43 |
| KR | 10-2020-0063314 A | 6/2020 | |
| KR | 10-2022-0019878 A | 2/2022 | |

* cited by examiner

*Primary Examiner* — Brian P Sweeney
(74) *Attorney, Agent, or Firm* — Morgan Lewis & Bockius LLP

(57) ABSTRACT

A method of controlling switching to a manual driving mode of an autonomous vehicle, enables switching to the manual driving mode to be safely performed without interfering with a nearby vehicle in a safe lane or a safe place according to a surrounding driving environment by allowing a driver to select between switching to the manual driving mode while driving or switching to the manual driving mode after stopping to switch to the manual driving mode while the autonomous vehicle is driven in an autonomous driving mode.

4 Claims, 7 Drawing Sheets

METHOD OF CONTROLLING SWITCHING TO MANUAL DRIVING MODE OF AUTONOMOUS VEHICLE

CROSS-REFERENCE TO RELATED APPLICATION

The present application claims priority to Korean Patent Application No. 10-2022-0122935 filed on Sep. 28, 2022, the entire contents of which are incorporated herein by reference.

BACKGROUND OF THE PRESENT DISCLOSURE

Field of the Present Disclosure

The present disclosure relates to a method of controlling switching to a manual driving mode of an autonomous vehicle. More particularly, it relates to a method of controlling switching to a manual driving mode of an autonomous vehicle allowing switching to the manual driving mode while driving and switching to the manual driving mode after stopping to be selectively performed for safe driving when a driving mode of the autonomous vehicle is switched from an autonomous driving mode to the manual driving mode.

Description of Related Art

A driving mode of an autonomous vehicle includes a manual driving mode in which a driver may directly intervene in driving, in addition to an autonomous driving mode in which the vehicle drives to a destination by itself without the driver directly operating a steering wheel, an accelerator pedal, and a brake pedal.

As the driving mode of the autonomous vehicle, it is possible to select an autonomous driving mode under control of an autonomous driving controller or a manual driving mode according to a driving operation of the driver depending on the intention of the driver to select the driving mode.

In other words, when the autonomous vehicle is driven in the autonomous driving mode, the driver can only select to change to one manual driving mode. When the driver selects the manual driving mode, switching to the manual driving mode is performed unconditionally regardless of a surrounding driving environment.

For example, when the autonomous vehicle is driven in the autonomous driving mode, if the driver selects to switch to the manual driving mode using a driving mode change switch, etc., switching to the manual driving mode is unconditionally performed regardless of a surrounding driving environment.

However, the moment the driving mode of the autonomous vehicle is switched from the autonomous driving mode to the manual driving mode, the driver encounters a variety of driving environments, such as sudden overtaking of another vehicle in an adjacent lane, sudden braking of a vehicle in front, or inability to secure a safe distance from a vehicle behind the autonomous vehicle. A collision accident may occur when a collision avoidance operation of the driver is insufficient or impossible in such a variety of driving environments.

Therefore, there is a demand for a method for safely switching to the manual driving mode in a safe lane or a safe place according to the surrounding driving environment in response to the driver selecting the manual driving mode when the autonomous vehicle is driven in the autonomous driving mode.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling switching to a manual driving mode of an autonomous vehicle, which enables switching to the manual driving mode to be safely performed without interfering with a nearby vehicle in a safe lane or a safe place according to a surrounding driving environment by allowing a driver to select between switching to the manual driving mode while driving or switching to the manual driving mode after stopping to switch to the manual driving mode while the autonomous vehicle is driven in an autonomous driving mode.

Various aspects of the present disclosure are directed to providing a method of controlling switching to a manual driving mode of an autonomous vehicle, the method including verifying, by an autonomous driving controller, whether a driver requests switching to the manual driving mode, determining, by the autonomous driving controller, whether the driver selects "switching to the manual driving mode while driving" or "switching to the manual driving mode after stopping", controlling, by the autonomous driving controller, switching to the manual driving mode after moving the autonomous vehicle to a safe lane including an agreed lane provided from a control center upon concluding that the driver selects "switching to the manual driving mode while driving", and controlling, by the autonomous driving controller, switching to the manual driving mode after moving the autonomous vehicle to a safe place including an agreed place provided from the control center upon concluding that the driver selects "switching to the manual driving mode after stopping."

In an exemplary embodiment of the present disclosure, the determining may include primarily displaying "switching to the manual driving mode" on a display when the driver requests switching to the manual driving mode, secondarily displaying "switching to the manual driving mode while driving" and "switching to the manual driving mode after stopping" to be selectable on the display when "switching to the manual driving mode" displayed on the display is selected, and transmitting a selection signal to the autonomous driving controller when one of "switching to the manual driving mode while driving" and "switching to the manual driving mode after stopping" secondarily displayed on the display is selected.

In another exemplary embodiment of the present disclosure, the determining may include displaying "switching to the manual driving mode while driving" and "switching to the manual driving mode after stopping" to be immediately selectable on a display when the driver requests switching to the manual driving mode, and transmitting a selection signal to the autonomous driving controller when one of "switching to the manual driving mode while driving" and "switching to the manual driving mode after stopping" displayed on the display is selected.

In yet another exemplary embodiment of the present disclosure, the controlling switching to the manual driving mode after moving the autonomous vehicle to the safe lane may include determining whether the autonomous vehicle is capable of arriving at the agreed lane within a predetermined time period, moving the autonomous vehicle to the agreed lane under driving control of the autonomous driving controller upon concluding that the autonomous vehicle is capable of arriving at the agreed lane within the predetermined time period, and switching, by the autonomous driving controller, a driving mode from an autonomous driving mode to the manual driving mode after the autonomous vehicle is moved to the agreed lane.

In yet another exemplary embodiment of the present disclosure, the method may further include finally verifying, by the autonomous driving controller, whether the driver switches the driving mode to the manual driving mode through notification control after the autonomous vehicle moves to the agreed lane, and controlling, by the autonomous driving controller, switching of the driving mode to the manual driving mode in a response that the driver accepts switching to the manual driving mode. In a response that the driver does not accept switching to the manual driving mode, the autonomous driving controller may perform a control operation to maintain the driving mode in the autonomous driving mode.

In still yet another exemplary embodiment of the present disclosure, the controlling switching to the manual driving mode after moving the autonomous vehicle to the safe lane may include determining whether the autonomous vehicle is capable of arriving at the agreed lane within a predetermined time period, determining a safety level of a following vehicle for each of all lanes in a road, which is a value obtained by dividing a distance from the following vehicle by a speed of the following vehicle, upon concluding that the autonomous vehicle is incapable of arriving at the agreed lane within the predetermined time period, determining whether there is a lane satisfying that the safety level of the following vehicle is greater than a threshold value among all the lanes, verifying whether a safety level of a following vehicle in a present lane, which is a current driving lane, is greater than a preset threshold value when there is a lane satisfying that the safety level of the following vehicle is greater than the threshold value among all the lanes, and switching, by the autonomous driving controller, the driving mode from the autonomous driving mode to the manual driving mode while maintaining driving in the present lane when the safety level of the following vehicle in the present lane is greater than the preset threshold value.

In a further exemplary embodiment of the present disclosure, the method may further include finally verifying, by the autonomous driving controller, whether the driver switches the driving mode to the manual driving mode through notification control while maintaining driving in the present lane, and controlling, by the autonomous driving controller, switching of the driving mode to the manual driving mode in a response that the driver accepts switching to the manual driving mode. In a response that the driver does not accept switching to the manual driving mode, the autonomous driving controller may perform a control operation to maintain the driving mode in the autonomous driving mode.

In another further exemplary embodiment of the present disclosure, the method may further include notifying, by the autonomous driving controller, the driver that "switching to the manual driving mode while driving" is impossible when there is no lane satisfying that the safety level of the following vehicle is greater than the threshold value among all the lanes, and reporting change to "switching to the manual driving mode after stopping."

In yet another further exemplary embodiment of the present disclosure, the controlling switching to the manual driving mode after moving the autonomous vehicle to the safe lane may include determining whether the autonomous vehicle is capable of arriving at the agreed lane within a predetermined time period, determining a safety level of a following vehicle for each of all lanes in a road, which is a value obtained by dividing a distance from the following vehicle by a speed of the following vehicle, upon concluding that the autonomous vehicle is incapable of arriving at the agreed lane within the predetermined time period, determining whether there is a lane satisfying that the safety level of the following vehicle is greater than a threshold value among all the lanes, verifying whether a safety level of a following vehicle in a present lane, which is a current driving lane, is greater than a preset threshold value when there is a lane satisfying that the safety level of the following vehicle is greater than the threshold value among all the lanes, determining a lane minimizing lane change among other lanes satisfying that the safety level of the following vehicle is greater than the threshold value when the safety level of the following vehicle in the present lane is less than the preset threshold value, and switching, by the autonomous driving controller, the driving mode from the autonomous driving mode to the manual driving mode after the autonomous vehicle changes lanes to another lane capable of minimizing lane change.

In yet another further exemplary embodiment of the present disclosure, the method may further include finally verifying, by the autonomous driving controller, whether the driver switches the driving mode to the manual driving mode through notification control after the autonomous vehicle moves to the lane minimizing lane change, and controlling, by the autonomous driving controller, switching of the driving mode to the manual driving mode in a response that the driver accepts switching to the manual driving mode. In a response that the driver does not accept switching to the manual driving mode, the autonomous driving controller may perform a control operation to maintain the driving mode in the autonomous driving mode.

In still yet another further exemplary embodiment of the present disclosure, the controlling switching to the manual driving mode after moving the autonomous vehicle to the safe place may include determining whether the autonomous vehicle is capable of arriving at the agreed place within a predetermined time period, moving the autonomous vehicle to the agreed place under driving control of the autonomous driving controller upon concluding that the autonomous vehicle is capable of arriving at the agreed place within the predetermined time period, and switching, by the autonomous driving controller, a driving mode from an autonomous driving mode to the manual driving mode after the autonomous vehicle is moved to the agreed place.

In a still further exemplary embodiment of the present disclosure, the method may further include finally verifying, by the autonomous driving controller, whether the driver switches the driving mode to the manual driving mode through notification control after the autonomous vehicle moves to the agreed place, and controlling, by the autonomous driving controller, switching of the driving mode to the manual driving mode in a response that the driver accepts switching to the manual driving mode. In a response that the driver does not accept switching to the manual driving mode, the autonomous driving controller may perform a control operation to maintain the driving mode in the autonomous driving mode.

In a yet still further exemplary embodiment of the present disclosure, the controlling switching to the manual driving mode after moving the autonomous vehicle to the safe place may include determining whether the autonomous vehicle is capable of arriving at the agreed place within a predetermined time period, determining whether arriving at another agreed place present on another driving path is possible upon concluding that the autonomous vehicle is incapable of arriving at the agreed place within the predetermined time period, changing paths and moving the autonomous vehicle to the other agreed place under driving control of the autonomous driving controller upon concluding that the autonomous vehicle is capable of arriving at the agreed place within the predetermined time period, and switching, by the autonomous driving controller, the driving mode from the autonomous driving mode to the manual driving mode after the autonomous vehicle is moved to the other agreed place.

In a yet still further exemplary embodiment of the present disclosure, the method may further include finally verifying, by the autonomous driving controller, whether the driver switches the driving mode to the manual driving mode through notification control after the autonomous vehicle is moved to the other agreed place, and controlling, by the autonomous driving controller, switching of the driving mode to the manual driving mode in a response that the driver accepts switching to the manual driving mode. In a response that the driver does not accept switching to the manual driving mode, the autonomous driving controller may perform a control operation to maintain the driving mode in the autonomous driving mode.

In a yet still further exemplary embodiment of the present disclosure, upon concluding that the autonomous vehicle is incapable of arriving at the other agreed place within the predetermined time period, the autonomous driving controller may perform a control operation to report that switching to the manual driving mode is currently impossible, and perform a control operation to maintain the driving mode in the autonomous driving mode.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
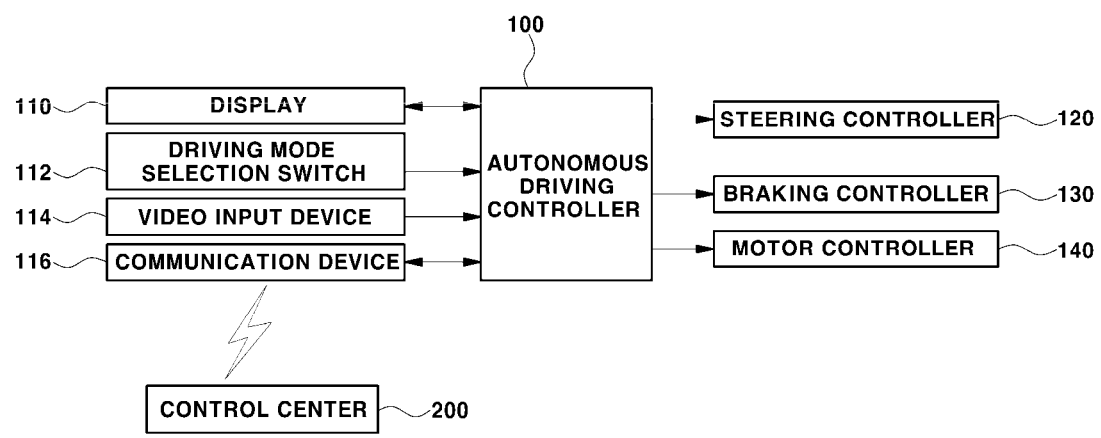
FIG. 1 and FIG. 2 are control configuration diagrams of a method of controlling switching to a manual driving mode of an autonomous vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

Figure 2:
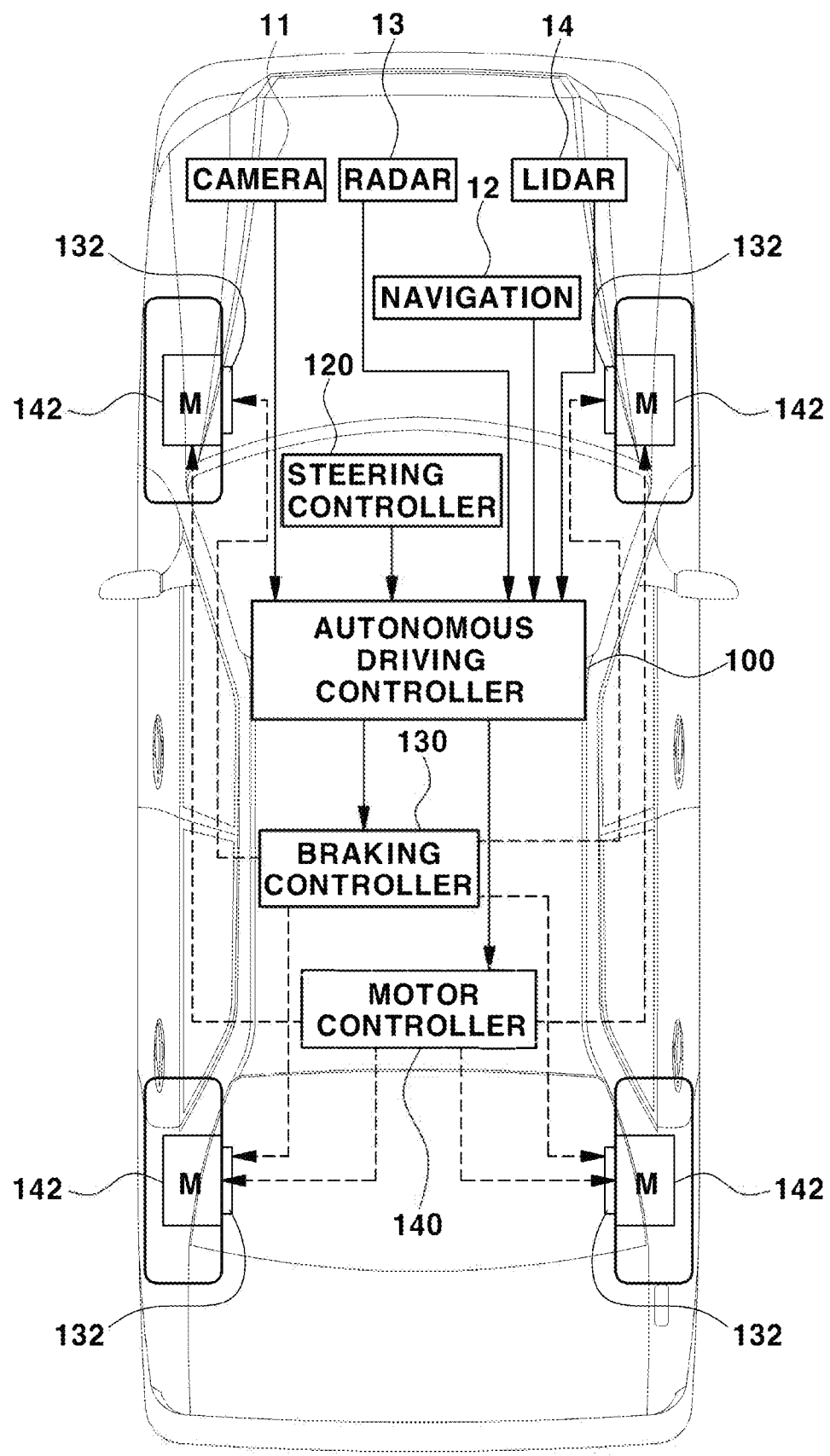

FIG. 1 and FIG. 2 are control configuration diagrams of a method of controlling switching to a manual driving mode of an autonomous vehicle according to an exemplary embodiment of the present disclosure.

As shown in FIG. 1, the autonomous vehicle is provided with an autonomous driving controller 100 for overall autonomous driving control. A display 110 for Audio, Video, Navigation (AVN), a driving mode selection switch 112, and a video input device 114 are connected to an input unit of the autonomous driving controller 100 to transmit and receive an electrical signal, and a steering controller 120 for steering control, a braking controller 130 for driving control such as acceleration and deceleration, and a motor controller 140 are connected to an output unit of the autonomous driving controller 100 to receive a command signal.

Furthermore, the autonomous vehicle is provided with a communication device 116 communicatively connected between the autonomous driving controller 100 and a control center 200, so that various monitoring information and command signals required for autonomous driving may be provided from the control center 200 to the autonomous driving controller 100 via the communication device 116.

As illustrated in FIG. 2, the autonomous driving controller 100 is configured to receive various monitoring information necessary for autonomous driving from a detection unit of autonomous driving including a camera 11, a navigation system 12, RADAR (Radio Detection and Ranging) 13, or LiDAR (Light Imaging Detection and Ranging) 14 mounted on the vehicle, and to perform overall driving control including control of a driving direction, acceleration, deceleration, etc. of the vehicle based on the present monitoring information.

Furthermore, the autonomous driving controller 100 is configured to perform a control operation to switch the driving mode to the autonomous driving mode or the manual driving mode according to a switching signal of the driving mode selection switch 112 which may be operated by the driver.

The steering controller 120 is configured to perform steering control depending on the intention for steering according to autonomous driving logic of the autonomous driving controller 100 or the intention for steering according to steering wheel operation of the driver.

The braking controller 130 is configured to control applying hydraulic braking torque to a hydraulic braking device 132 mounted on each wheel according to a hydraulic braking torque command from the autonomous driving controller 100.

The brake controller 130 may be an integrated electric brake (IEB) controller including electronic stability control (ESC) for body posture control.

The motor controller 140 is for driving torque control and regenerative braking torque control for driving in an in-wheel motor (IWM) 142 mounted on each wheel, and is configured to perform a control operation to apply individual regenerative braking torque and/or driving torque to each in-wheel motor 142 mounted on each wheel according to a driving torque command or a regenerative braking torque command of the autonomous driving controller 100.

Figure 5:
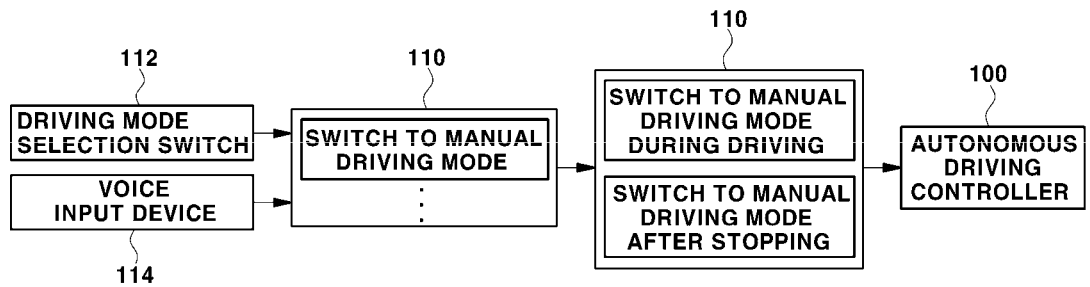
FIG. 5 and FIG. 6 are schematic diagrams illustrating examples in which a driver selects the manual driving mode in the method of controlling switching to the manual driving mode of the autonomous vehicle according to an exemplary embodiment of the present disclosure.

Meanwhile, when the driver presses a manual driving mode button of the driving mode selection switch 112 or requests switching to the manual driving mode through the video input device 114, as illustrated in FIG. 5, message of "switching to the manual driving mode" is primarily displayed on the display 110 so that selection (for example, touch input) is possible to clearly distinguish whether or not the driver requests the manual driving mode. When "switching to the manual driving mode" displayed on the display 110 is selected (for example, touch input), "switching to the manual driving mode while driving" and "switching to the manual driving mode after stopping" may be displayed on the display 110 so that selection (for example, touch input) is possible.

Accordingly, when the driver selects one of "switching to the manual driving mode while driving" and "switching to the manual driving mode after stopping" displayed on the display 110, a selection signal may be transmitted to the autonomous driving controller 100.

Figure 6:
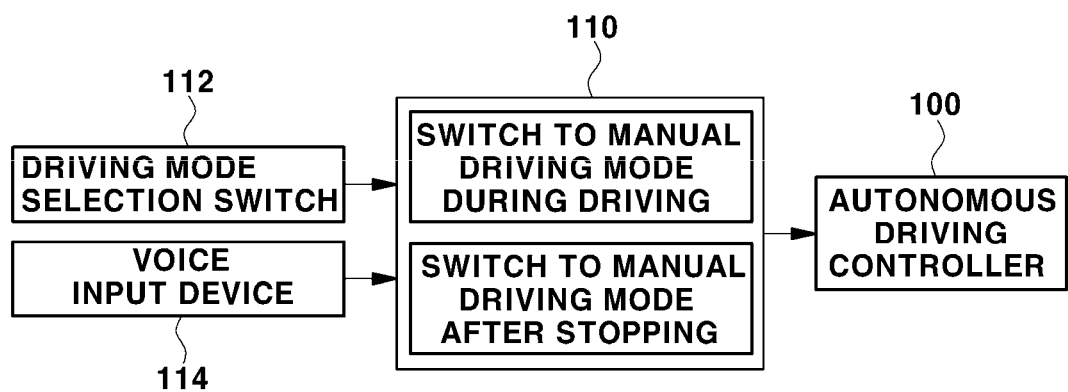

Alternatively, when the driver presses the manual driving mode button of the driving mode selection switch 112 or requests switching to the manual driving mode through the video input device 114, "switching to the manual driving mode while driving" and "switching to the manual driving mode after stopping" may be immediately displayed on the display 110 so that selection (for example, touch input) is possible as illustrated in FIG. 6. Accordingly, when the driver selects one of "switching to the manual driving mode while driving" and "switching to the manual driving mode after stopping" displayed on the display 110, a selection signal may be transmitted to the autonomous driving controller 100.

Accordingly, the autonomous driving controller 100 may be configured to control switching to the manual driving mode of the autonomous vehicle in a safe lane, such as a low-speed lane, a lane having a high safety level for a following vehicle, an agreed lane, etc. in response to the driver receiving a signal to select "switching to the manual driving mode while driving."

As an exemplary embodiment of the present disclosure, the autonomous driving controller 100 is configured to control switching to the manual driving mode after moving the vehicle to an agreed lane provided through communication with the control center 200 among safe lanes (a safe designated lane such as a bus-only lane, or a safe lane in which a safe distance from a nearby vehicle is confirmed through communication with the control center) in the case of receiving a signal indicating that the driver selects "switching to the manual driving mode while driving."

As an exemplary embodiment of the present disclosure, the autonomous driving controller 100 is configured to determine a safety level of a following vehicle for each lane when it is impossible to arrive within a predetermined time period at an agreed lane provided through communication with the control center 200 among the safe lanes, and to control switching to the manual driving mode in a present lane when a safety level of a following vehicle in the present lane, which is a current driving lane, is greater than a preset threshold value in the case of receiving a signal indicating that the driver selects "switching to the manual driving mode while driving."

As yet another example, the autonomous driving controller 100 is configured to move the vehicle to a lane minimizing lane change among lanes in which a safety level of a following vehicle is greater than the preset threshold value, and then control switching to the manual driving mode when it is impossible to arrive within a predetermined time period at an agreed lane provided through communication with the control center 200 among the safe lanes, and a safety level of a following vehicle in the present lane, which is a current driving lane, is less than the preset threshold value in the case of receiving a signal indicating that the driver selects "switching to the manual driving mode while driving."

Accordingly, when the driver selects "switching to the manual driving mode while driving" for switching to the manual driving mode, the autonomous driving controller 100 performs switching to the manual driving mode after moving to the agreed lane, or performs switching to the manual driving mode while maintaining the present lane, which is the current driving lane, or after changing lanes to another driving lane in consideration of the safety level of the following vehicle, so that the autonomous vehicle may be safely switched to the manual driving mode.

On the other hand, the autonomous driving controller 100 may be configured to control switching to the manual driving mode of the autonomous vehicle after moving the vehicle to a safe place where it is easy to switch to the manual driving mode in the case of receiving a signal indicating that the driver selects "switching to the manual driving mode after stopping."

As an exemplary embodiment of the present disclosure, the autonomous driving controller 100 is configured to control switching to the manual driving mode after moving the vehicle to a safe place such as a road shoulder, a rest area, a drowsiness shelter, or a place agreed in advance through communication with the control center 200 in the case of receiving a signal indicating that the driver selects "switching to the manual driving mode after stopping" or in the case where all safety levels of following vehicles for each lane are less than the threshold value.

As an exemplary embodiment of the present disclosure, the autonomous driving controller 100 is configured to control switching to the manual driving mode after searching for another safe place which may be reached within a predetermined time period on another driving path and moving the vehicle to another safe place when it is impossible to arrive within a predetermined time period at a safe place such as a road shoulder, a rest area, a drowsiness shelter, or a place agreed in advance through communication with the control center 200 in the case of receiving a signal indicating that the driver selects "switching to the manual driving mode after stopping" or in the case where all safety levels of following vehicles for each lane are less than the threshold value.

Accordingly, when the driver selects "switching to the manual driving mode after stopping" for switching to the manual driving mode, the autonomous vehicle may be safely switched to the manual driving mode after moving the vehicle to a safe place where it is easy to switch to the manual driving mode.

Here, a method of controlling switching to the manual driving mode of the autonomous vehicle of the present disclosure based on the above configuration will be sequentially referred to as follows.

Figure 3:
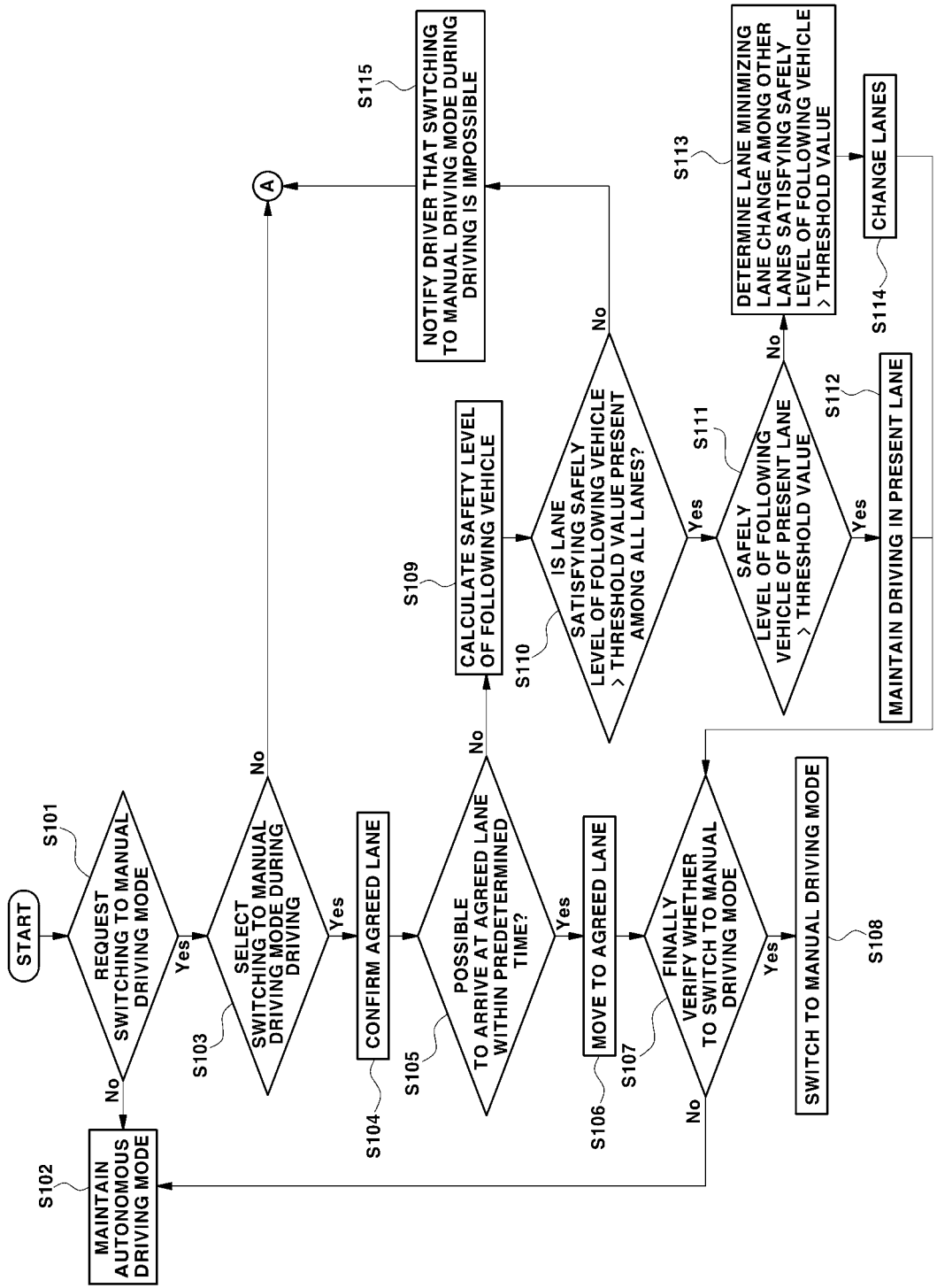
FIG. 3 and FIG. 4 are flowcharts illustrating the method of controlling switching to the manual driving mode of the autonomous vehicle according to an exemplary embodiment of the present disclosure.
Figure 4:
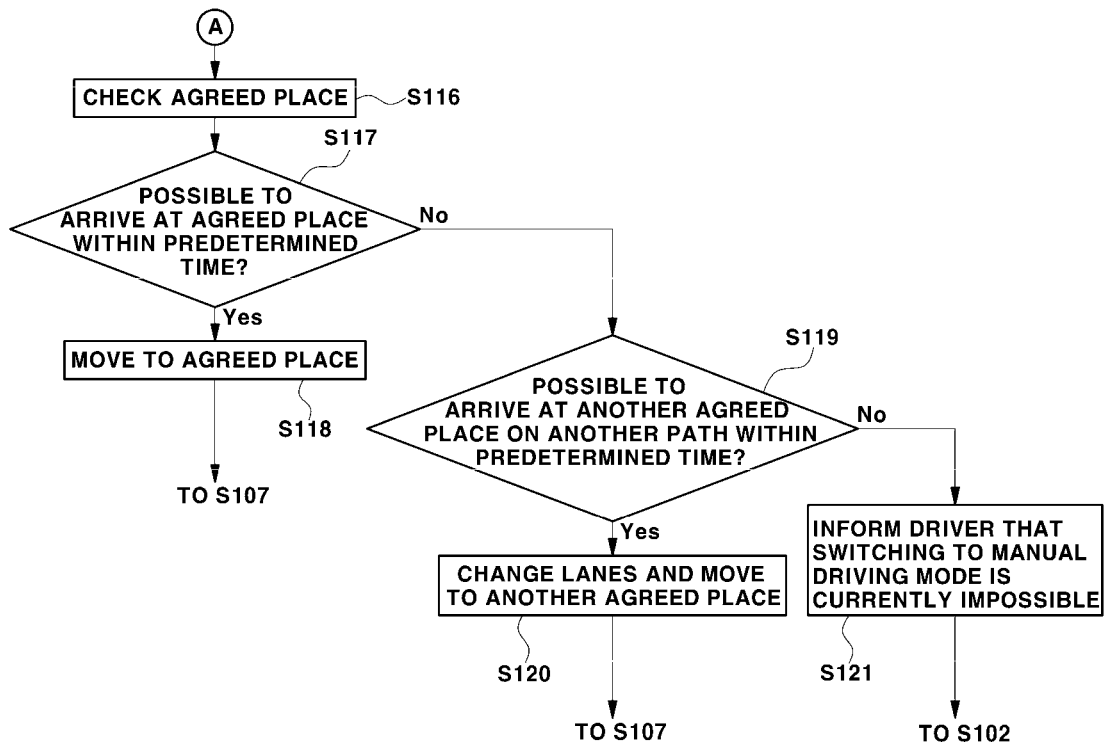

FIG. 3 and FIG. 4 are flowcharts illustrating the method of controlling switching to the manual driving mode of the autonomous vehicle according to an exemplary embodiment of the present disclosure.

First, while the autonomous vehicle is driven in the autonomous driving mode, the autonomous driving controller 100 verifies whether the driver requests switching to the manual driving mode (S101).

For example, when the driver presses the manual driving mode button of the driving mode selection switch 112 or requests switching to the manual driving mode through the voice input device 114, the autonomous driving controller 100 may confirm that there is a request for switching to the manual driving mode.

It is obvious that, when there is no request for switching to the manual driving mode, the autonomous driving controller 100 maintains the driving mode of the autonomous vehicle in the autonomous driving mode (S102).

Next, it is determined whether the driver selects "switching to the manual driving mode while driving" or "switching to the manual driving mode after stopping" to switch to the manual driving mode (S103).

That is, the autonomous driving controller 100 determines whether the driver selects "switching to the manual driving mode while driving" or "switching to the manual driving mode after stopping."

For example, when the driver presses the manual driving mode button of the driving mode selection switch 112 or requests switching to the manual driving mode through the voice input device 114, "switching to the manual driving mode" is primarily displayed on the display 110 to be selectable to clearly distinguish whether the driver requests switching to the manual driving mode as illustrated in FIG. 5. When the driver selects "switching to the manual driving mode" displayed on the display 110, "switching to the manual driving mode while driving" and "switching to the manual driving mode after stopping" may be secondarily displayed on the display 110 to be selectable. Accordingly, when the driver selects one of "switching to the manual driving mode while driving" and "switching to the manual driving mode after stopping" secondarily displayed on the display 110, a selection signal may be transmitted to the autonomous driving controller 100.

Alternatively, when the driver presses the manual driving mode button of the driving mode selection switch 112 or requests switching to the manual driving mode through the voice input device 114, "switching to the manual driving mode while driving" and "switching to the manual driving mode after stopping" may be immediately displayed on the display 110 to be intuitively selectable as illustrated in FIG. 6. Accordingly, when the driver selects one of "switching to the manual driving mode while driving" and "switching to the manual driving mode after stopping" displayed on the display 110, a selection signal may be transmitted to the autonomous driving controller 100.

Next, upon determining that the driver selects "switching to the manual driving mode while driving" as a result of determination in step S103, the autonomous driving controller 100 is configured to control switching to the manual driving mode of the autonomous vehicle after moving the vehicle to a safe lane such as a low-speed lane, a lane having a high safety level for a following vehicle, an agreed lane, etc.

To the present end, first, the autonomous driving controller 100 communicates with the control center 200 through the communication device 116 to confirm the agreed lane provided from the control center 200 (S104).

For reference, the agreed lane is defined as a safe designated lane such as a bus-only lane, or a safe lane in which a safe distance from a nearby vehicle, which is present at a side of or behind the autonomous vehicle, is confirmed through communication with the control center.

Furthermore, the control center 200 may check the amount of traffic for nearby vehicles of the autonomous vehicle to identify which lane on which road is the safest for switching to the manual driving mode as a whole, and provide an identified agreed lane to the autonomous driving controller 100 through the communication device 116.

Subsequently, it is determined whether the autonomous vehicle can arrive at the agreed lane within a predetermined time period (S105).

That is, it is determined whether the autonomous vehicle can change lanes and move to the agreed lane within a predetermined time period.

In the present instance, a reason for determining whether or not the autonomous vehicle can arrive at the agreed lane within the predetermined time period is that a safe distance with respect to the nearby vehicle, which is present at the side of or behind the autonomous vehicle, cannot be ensured depending on the driving movement of the nearby vehicle after the predetermined time period.

For example, the autonomous driving controller 100 may receive a relative distance and a relative speed of the nearby vehicle, which is present at the side of or behind the autonomous vehicle, from the detection unit for autonomous driving including the camera 11, the navigation system 12, the RADAR 13, or the LiDAR 14, and determine whether the autonomous vehicle can arrive at the agreed lane within the predetermined time period based thereon.

Subsequently, upon determining that the autonomous vehicle can arrive at the agreed lane within the predetermined time period, the vehicle may be moved to the agreed lane by driving control of the autonomous driving controller 100 (S106).

For example, the autonomous driving controller 100 instructs the steering controller 120 to apply a steering angle signal for moving to the agreed lane, and instructs the motor controller 140 to apply driving torque of the in-wheel motor 142 for moving to the agreed lane, so that the vehicle may be easily moved to the agreed lane based on the steering control of the steering controller 120 and the driving torque control of the motor controller 140 on the in-wheel motor.

In the present instance, it is possible to switch to the manual driving mode after the autonomous vehicle is moved to the agreed lane, an agreed place, etc. However, switching to the manual driving mode without any notice to the driver may confuse the driver.

Accordingly, after the autonomous vehicle is moved to the agreed lane, an agreed place, etc., the autonomous driving controller 100 finally verifies whether the driver switches the driving mode to the manual driving mode through notification control (S107).

For example, when the autonomous driving controller 100 performs a control operation to display words of guidance asking whether to switch to the manual driving mode on the display 110 for AVN, it is possible to finally verify whether the driver switches the driving mode to the manual driving mode.

Subsequently, when the driver accepts switching to the manual driving mode, the autonomous driving controller 100 performs a control operation to switch a current driving mode from the autonomous driving mode to the manual driving mode (S108).

For example, in response to touching and inputting YES in the words of guidance asking whether to switch to the manual driving mode displayed on the display 110, the autonomous driving controller 100 performs a control operation to switch the current driving mode from the autonomous driving mode to the manual driving mode.

On the other hand, when the driver does not accept switching to the manual driving mode, and the autonomous driving controller 100 maintains the driving mode in the autonomous driving mode (S102).

For example, in the case where the driver intends to switch to the manual driving mode and then changes his or her mind and intends to maintain the autonomous driving mode, in response to touching and inputting NO in the words of guidance asking whether to switch to the manual driving mode displayed on the display 110, the autonomous driving controller 100 performs a control operation to maintain the driving mode in the autonomous driving mode.

Accordingly, when the driver selects "switching to the manual driving mode while driving" for switching to the manual driving mode, the autonomous driving controller 100 moves the autonomous vehicle to the agreed lane and then switches to the manual driving mode, so that the autonomous vehicle may be safely switched to the manual driving mode in an agreed lane, which is a safe lane, where there is no interference with the nearby vehicle.

On the other hand, upon determining that the autonomous vehicle cannot arrive at the agreed lane within the predetermined time period as a result of the determination in step S105, a safety level of a following vehicle, which is defined to the extent that switching to the manual driving mode may be made within a safe range without interference with the following vehicle, is determined (S109).

In other words, upon determining that the autonomous vehicle cannot arrive at the agreed lane within the predetermined time period, the autonomous driving controller 100 determines that it is not safe to switch to the manual driving mode in the agreed lane, and determines the safety level of the following vehicle for all lanes using the following Equation 1.

$$\text{Safety level of following vehicle} = \text{Distance from following vehicle} / \text{Speed of following vehicle} \quad \text{(Equation 1)}$$

For example, the autonomous driving controller 100 may be provided with information related to a distance from the following vehicle and a speed of the following vehicle for all lanes from the detection unit for autonomous driving including the camera 11, the navigation system 12, the RADAR 13, or the LiDAR 14, and easily determine the safely level of the following vehicle.

A reason for determining the safely level of the following vehicle is that it is more advantageous to change lanes as the distance from the following vehicle increases, and the distance from the following vehicle is divided by the speed of the following vehicle since a time taken for the following vehicle to approach the autonomous vehicle (subject vehicle) gradually decreases as the speed of the following vehicle increases, and thus there is a risk of collision interference with the following vehicle when switching to the manual driving mode.

For example, when the time taken for the following vehicle to approach the autonomous vehicle (subject vehicle) gradually decreases, the driver may encounter a driving environment where a safe distance from the following vehicle is not ensured at the moment of switching the driving mode of the autonomous vehicle from the autonomous driving mode to the manual driving mode. Thus, when collision avoidance operation of the driver in the manual driving mode is insufficient or impossible, a collision accident may occur.

Subsequently, the safely level of the following vehicle is compared with a preset threshold value for all lanes in a road, and it is determined whether there is a lane satisfying that the safely level of the following vehicle is greater than the preset threshold value among all the lanes (S110).

In other words, to verify whether there is a lane in which the autonomous vehicle may be switched to the manual driving mode within a safe range without interference with the following vehicle, the autonomous driving controller 100 compares the safely level of the following vehicle with the preset threshold value for each lane, and determines whether there is a lane satisfying that the safely level of the following vehicle is greater than the threshold value among all the lanes.

When there is a lane satisfying that the safely level of the following vehicle is greater than the threshold value among all the lanes as a result of determination in step S110, it is further verified whether the safety level of the following vehicle in the present lane, which is the current driving lane, is greater than the preset threshold value (S111).

When the safety level of the following vehicle in the present lane, which is the current driving lane, is greater than the preset threshold value as a result of verification, the autonomous driving controller 100 performs a control operation to maintain driving in the present lane without separate lane change (S112).

In the present instance, a reason for maintaining driving in the present lane without a separate lane change when the safety level of the following vehicle in the present lane is greater than the preset threshold value is to prevent unnecessary energy consumption due to the separate lane change.

Subsequently, while the autonomous vehicle maintains driving in the present lane, the autonomous driving controller 100 finally verifies whether the driver switches the driving mode to the manual driving mode through notification control as in the above step S107. When the driver accepts switching to the manual driving mode as in the above step S108, the autonomous driving controller 100 performs a control operation to switch the current driving mode from the autonomous driving mode to the manual driving mode.

Accordingly, in the case where the driver selects "switching to the manual driving mode while driving" for switching to the manual driving mode, even when it is determined that the autonomous vehicle cannot arrive at the agreed lane within the predetermined time period, the autonomous driving controller 100 may easily and safely switch the autonomous vehicle to the manual driving mode in the present lane where there is no interference with the nearby vehicle.

On the other hand, when the safety level of the following vehicle in the present lane, which is the current driving lane, is less than the preset threshold value as a result of verification in the above step S111, the autonomous driving controller 100 determines that switching to the manual driving mode in the present lane is not safe, and determines a lane that minimizes a lane change among other lanes in which the safety level of the following vehicle is greater than the threshold value (S113).

That is, upon confirming that the safety level of the following vehicle in the present lane, which is the current driving lane, is less than the preset threshold value, the autonomous driving controller 100 determines a lane to which the vehicle can move while minimizing a lane change among other lanes in which the safety level of the following vehicle is greater than the threshold value.

Figure 7:
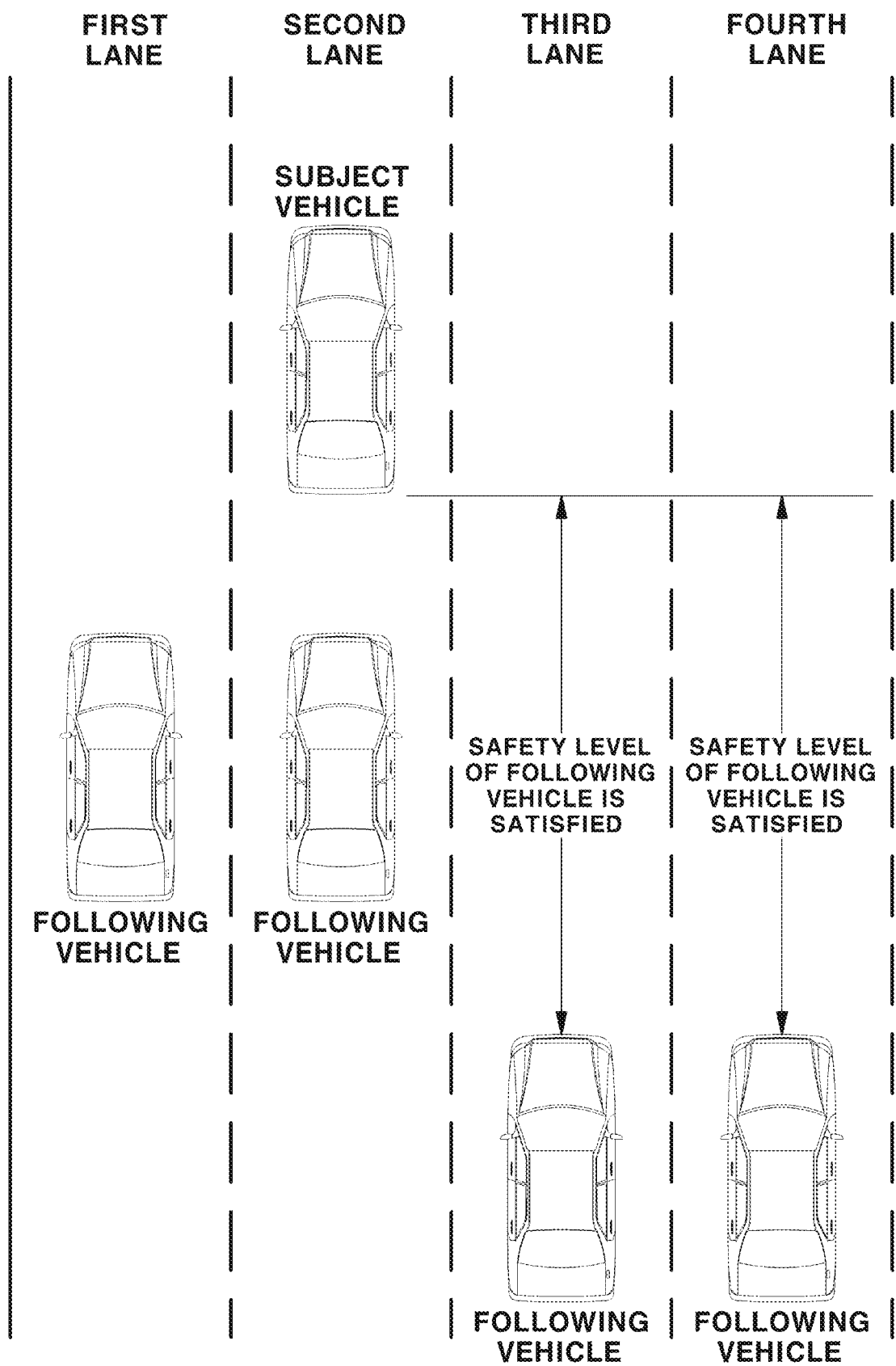
FIG. 7 and FIG. 8 are schematic diagrams illustrating examples of satisfying a safety level of a following vehicle for each lane in the method of controlling switching to the manual driving mode of the autonomous vehicle according to an exemplary embodiment of the present disclosure.

As an exemplary embodiment of the present disclosure, as illustrated in FIG. 7, when the autonomous vehicle (subject vehicle) is traveling in the second lane, and the third and fourth lanes are lanes satisfying that the safety level of the following vehicle is greater than the threshold value, it is possible to minimize the number of lane changes and travel distance by changing lanes to the nearest third lane.

Figure 8:
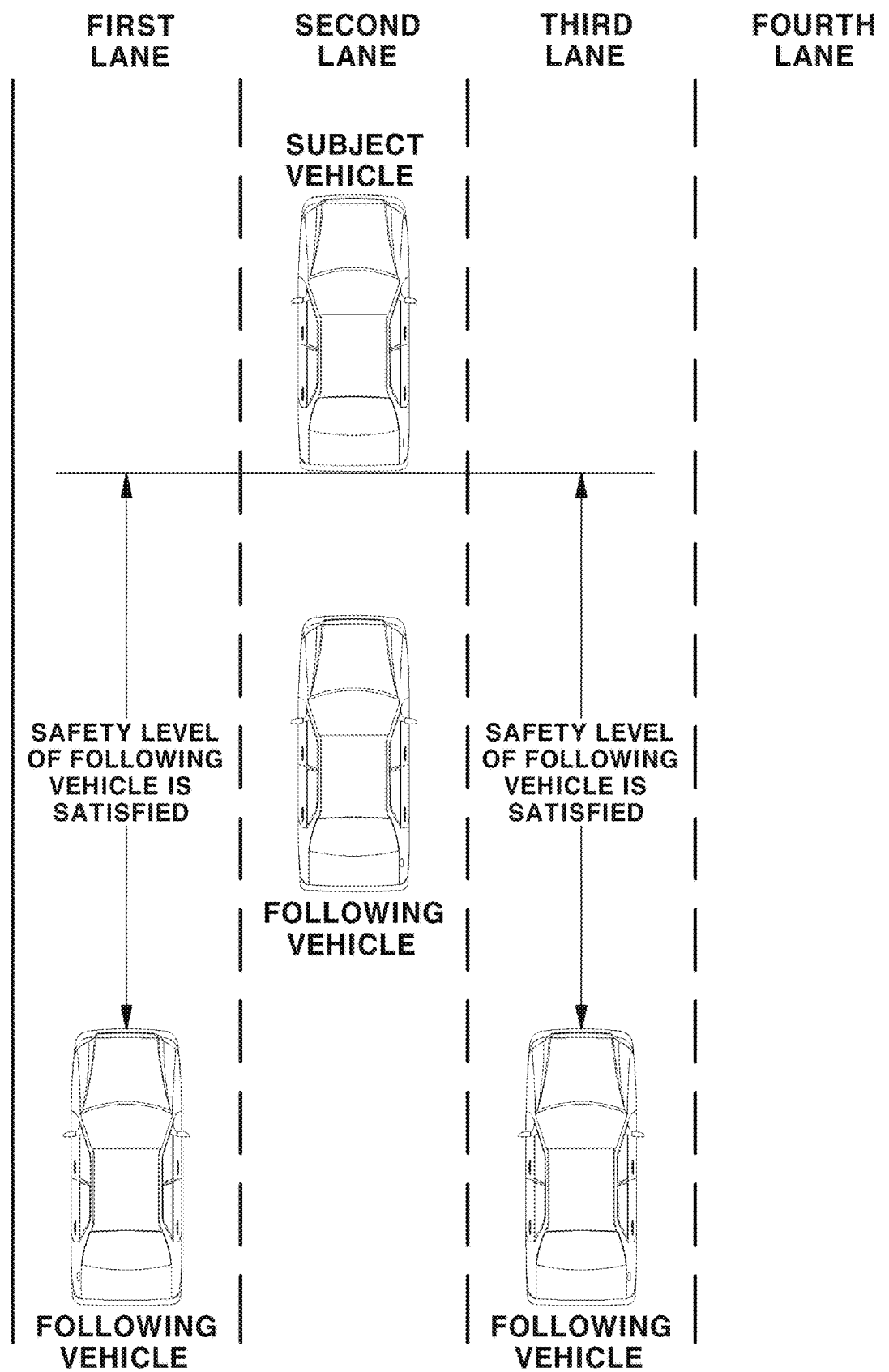

As an exemplary embodiment of the present disclosure, as illustrated in FIG. 8, when the autonomous vehicle (subject vehicle) is traveling in the second lane, and the high-speed first lane and the low-speed third lane are lanes satisfying that the safety level of the following vehicle is greater than the threshold value, the lane is changed to the third lane because the third lane is a slower lane than the first lane.

Subsequently, the vehicle may be moved while changing lanes to another lane that minimizes lane change under driving control of the autonomous driving controller 100 (S114).

For example, the autonomous driving controller 100 instructs the steering controller 120 to apply a steering angle signal for changing lanes and moving to the other lane, and instructs the motor controller 140 to apply driving torque of the in-wheel motor 142 for changing lanes and moving to the other lane, so that the vehicle may easily change lanes and move to the other lane based on steering control of the steering controller 120 and driving torque control of the motor controller 140 on the in-wheel motor.

Alternatively, the autonomous driving controller 100 instructs the steering controller 120 to apply a steering angle signal for changing lanes and moving to the other lane, instructs the motor controller 140 to apply driving torque of the in-wheel motor 142 for changing lanes and moving to the other lane, and instructs the braking controller 130 to apply partial braking torque for changing lanes and moving to the other lane, so that the vehicle may easily change lanes and move to the other lane based on steering control of the steering controller 120, driving torque control of the motor controller 140 on the in-wheel motor, and selective braking torque application control of the braking controller 130 on the hydraulic braking device 132 mounted on each wheel.

Next, in a state in which the autonomous vehicle changes to the other lane, the autonomous driving controller 100 finally verifies whether the driver switches the driving mode to the manual driving mode through notification control as in step S107. When the driver accepts switching to the manual driving mode as in the above step S108, the autonomous driving controller 100 performs a control operation to switch the current driving mode from the autonomous driving mode to the manual driving mode.

Accordingly, when the driver selects "switching to the manual driving mode while driving" for switching to the manual driving mode, it is determined that the autonomous vehicle cannot arrive at the agreed lane within the predetermined time period. When the safety level of the following vehicle in the present lane is less than the preset threshold value, the autonomous driving controller 100 moves the autonomous vehicle to another safe lane where there is no interference with the nearby vehicle, and then easily and safely switches the autonomous vehicle to the manual driving mode.

On the other hand, when the driver selects "switching to the manual driving mode after stopping" for switching to the manual driving mode as a result of determination of the above step S103, the autonomous driving controller 100 moves the vehicle to a safe place where switching to the manual driving mode is easy, and then is configured to control switching to the manual driving mode of the autonomous vehicle.

Alternatively, when there is no lane satisfying that the safety level of the following vehicle is greater than the threshold value among all the lanes as a result of determination in the above step S110, the autonomous driving controller 100 forcibly selects "switching to the manual driving mode after stopping" to move the vehicle to a safe place where switching to the manual driving mode is easy, and then is configured to control switching to the manual driving mode of the autonomous vehicle.

In other words, when there is no lane satisfying that the safety level of the following vehicle is greater than the threshold value among all the lanes, the driver may encounter a driving environment where a safe distance from the following vehicle is not ensured at the moment of switching the driving mode of the autonomous vehicle from the autonomous driving mode to the manual driving mode. Thus, when collision avoidance operation of the driver in the manual driving mode is insufficient or impossible, a collision accident may occur. Therefore, the autonomous driving controller 100 forcibly selects "switching to the manual driving mode after stopping" to move the vehicle to a safe place where switching to the manual driving mode is easy, and then is configured to control switching to the manual driving mode of the autonomous vehicle.

In the present instance, when there is no lane satisfying that the safety level of the following vehicle is greater than the threshold value among all the lanes, the autonomous driving controller 100 notifies the driver that "switching to the manual driving mode while driving" is impossible through an alarm (S115).

For example, the autonomous driving controller 100 performs a control operation to notify the driver that, even though the driver selects "switching to the manual driving mode while driving," there is no lane satisfying that the safety level of the following vehicle is greater than the threshold value among all the lanes, and thus "switching to the manual driving mode while driving" is impossible and changed to "switching to the manual driving mode after stopping" visually through a display or a cluster or by voice through a speaker, etc.

As described above, in the case of receiving a signal indicating that the driver selects "switching to the manual driving mode after stopping" or in the case where there is no lane satisfying that the safety level of the following vehicle is greater than the threshold value among all the lanes, the autonomous driving controller 100 moves the vehicle to a safe place where switching to the manual driving mode is easy, and then is configured to control switching to the manual driving mode of the autonomous vehicle.

To the present end, first, a road shoulder, a rest area, a drowsiness shelter, or a place agreed in advance through communication with the control center 200 is checked as the safe place (S116).

For example, the autonomous driving controller 100 may communicate with the control center 200 through the communication device 116 to conform an agreed place provided from the control center 200.

For reference, the agreed place is a place where switching to the manual driving mode may be safely performed, and refers to a pre-designated place such as a bus terminal or a rest area, or a road shoulder, a drowsiness shelter, etc., safety of which is confirmed through communication with the control center.

Subsequently, it is determined whether the autonomous vehicle can arrive at the agreed place within the predetermined time period (S117).

The predetermined time period may be a preset time for performing switching to the manual driving mode as rapidly as possible by the autonomous driving controller, and may be a time changeable by the driver through an input device such as a display.

For example, the autonomous driving controller 100 may check the agreed place provided from the control center 200 through the navigation system 12, and then determine whether the autonomous vehicle can arrive at the agreed place within the predetermined time period.

Subsequently, upon determining that the autonomous vehicle can arrive at the agreed place within the predetermined time period, the vehicle may be moved to the agreed place under driving control of the autonomous driving controller 100 (S118).

For example, the autonomous driving controller 100 instructs the steering controller 120 to apply a steering angle signal for moving to the agreed place, and instructs the motor controller 140 to apply driving torque of the in-wheel motor 142 for moving to the agreed place, so that the vehicle may be easily moved to the agreed place under steering control of the steering controller 120 and driving torque control of the motor controller 140 on the in-wheel motor.

Next, in a state in which the autonomous vehicle moves to the agreed place, when the autonomous driving controller 100 finally verifies whether the driver switches the driving mode to the manual driving mode through notification control as in the above step S107, and the driver accepts switching to the manual driving mode as in the above step S108, the autonomous driving controller 100 performs a control operation to switch the current driving mode from the autonomous driving mode to the manual driving mode.

Accordingly, in the case where the driver selects "switching to the manual driving mode after stopping", or in the case where there is no lane satisfying that the safety level of the following vehicle is greater than the threshold value among all the lanes, switching to the manual driving mode of the autonomous vehicle may be safely controlled after the vehicle moves to the agreed place where switching to the manual driving mode may be safely performed.

On the other hand, upon determining that the autonomous vehicle cannot arrive at the agreed place within the predetermined time period as a result of determination in the above step S117, it is determined whether the vehicle can arrive at another agreed place present on another driving path within the predetermined time period (S119).

For example, the autonomous driving controller 100 may check another agreed place provided from the control center 200 through the navigation system 12, and then determine whether the autonomous vehicle can arrive at the other agreed place within the predetermined time period.

Subsequently, upon determining that the autonomous vehicle can arrive at the other agreed place within the predetermined time period, the vehicle may change the path and move to the other agreed place under driving control of the autonomous driving controller 100 (S120).

For example, the autonomous driving controller 100 instructs the steering controller 120 to apply a steering angle signal for moving to the other agreed place, and instructs the motor controller 140 to apply driving torque of the in-wheel motor 142 for moving to the other agreed place, so that the vehicle may be easily moved to the other agreed place under steering control of the steering controller 120 and driving torque control of the motor controller 140 on the in-wheel motor.

Next, in a state in which the autonomous vehicle moves to the other agreed place, when the autonomous driving controller 100 finally verifies whether the driver switches the driving mode to the manual driving mode through notification control as in the above step S107. When the driver accepts switching to the manual driving mode as in the above step S108, the autonomous driving controller 100 performs a control operation to switch the current driving mode from the autonomous driving mode to the manual driving mode.

Accordingly, in the case where the driver selects "switching to the manual driving mode after stopping", or in the case where there is no lane satisfying that the safety level of the following vehicle is greater than the threshold value among all the lanes, switching to the manual driving mode of the autonomous vehicle may be safely controlled after the vehicle moves to the other agreed place where switching to the manual driving mode may be safely performed.

On the other hand, upon determining that the autonomous vehicle cannot arrive at the other agreed place within the predetermined time period as a result of determination in the above step S119, the autonomous driving controller 100 performs a control operation to report that switching to the manual driving mode is currently impossible due to safety (S121), and performs a control operation to maintain the driving mode in the autonomous driving mode.

For example, the autonomous driving controller 100 performs a control operation to report that switching to the manual driving mode is currently impossible due to safety visually through a display or a cluster or by voice through a speaker, etc.

After performing a control operation to report that switching to the manual driving mode is currently impossible due to safety, the autonomous driving controller 100 may further perform a control operation to inform the driver that switching to the manual driving mode may be performed through "switching to the manual driving mode while driving" or "switching to the manual driving mode after stopping" after a driving environment changes for a certain time period, notifying the driver that switching to the manual driving mode is currently possible.

As described above, when changing from the autonomous driving mode to the manual driving mode, the driver may directly select whether to switch to the manual driving mode while driving by changing lanes or while maintaining a current lane, or whether to switch to the manual driving mode after stopping by moving to a safe place. Thus, it is possible to expand options of the driver for switching to the manual driving mode, and to more safely switch to the manual driving mode.

Through the means for solving the above problems, various aspects of the present disclosure are directed to providing the following effects.

First, when changing from the autonomous driving mode to the manual driving mode, the driver may directly select whether to switch to the manual driving mode while driving, or whether to switch to the manual driving mode after stopping by moving to a safe place. Thus, it is possible to expand options of the driver for switching to the manual driving mode, and to more safely switch to the manual driving mode.

Second, when the driver selects switching to the manual driving mode while driving, switching to the manual driving mode may be performed in a safe lane such as a low-speed lane, a lane having a high safety level for a following vehicle, an agreed lane, etc.

That is, when the driver selects switching to the manual driving mode while driving, switching to the manual driving mode is performed after moving to the agreed lane, or switching to the manual driving mode is performed while maintaining the present lane, which is the current driving lane, or after changing lanes to another driving lane in consideration of the safety level of the following vehicle, so that the autonomous vehicle may be safely switched to the manual driving mode.

Third, when the driver selects switching to the manual driving mode after stopping, the autonomous vehicle may be safely switched to the manual driving mode after the vehicle moves to a safe place where switching to the manual driving mode is easy.

That is, when the driver selects switching to the manual driving mode after stopping, the autonomous vehicle may be safely switched to the manual driving mode after the vehicle moves to a safe place such as a road shoulder, a rest area, a drowsiness shelter, or a place agreed in advance through communication with the control center.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling switching to a manual driving mode of an autonomous vehicle, the method comprising:
   verifying, by an autonomous driving controller, whether a driver requests switching to the manual driving mode;
   determining, by the autonomous driving controller, whether the driver selects a first option to be switched to the manual driving mode while driving or a second option to be switched to the manual driving mode after stopping;
   controlling, by the autonomous driving controller, switching to the manual driving mode after moving the autonomous vehicle to a safe lane including an agreed lane provided from a control center upon concluding that the driver selects the first option; and
   controlling, by the autonomous driving controller, switching to the manual driving mode after moving the autonomous vehicle to a safe place including an agreed place provided from the control center upon concluding that the driver selects the second option.

2. The method of claim 1, where the controlling of switching to the manual driving mode after moving the autonomous vehicle to the safe lane includes:
   determining, by the autonomous driving controller, whether the autonomous vehicle is capable of arriving at the agreed lane within a predetermined time period based on nearby vehicle information from one or more sensors;
   moving the autonomous vehicle to the agreed lane under driving control of the autonomous driving controller upon concluding that the autonomous vehicle is capable of arriving at the agreed lane within the predetermined time period; and
   switching, by the autonomous driving controller, a driving mode of the autonomous vehicle from an autonomous driving mode to the manual driving mode after the autonomous vehicle is moved to the agreed lane.

3. The method of claim 2, further including finally verifying, by the autonomous driving controller, whether the driver switches the driving mode to the manual driving mode through notification control after the autonomous vehicle moves to the agreed lane, and controlling, by the autonomous driving controller, switching of the driving mode to the manual driving mode in a response that the driver accepts switching to the manual driving mode.

4. The method of claim 3, wherein, in a response that the driver does not accept switching to the manual driving mode, the autonomous driving controller is configured to perform a control operation to maintain the driving mode in the autonomous driving mode.

\* \* \* \* \*